United States Patent
Chua

(10) Patent No.: US 9,018,785 B2
(45) Date of Patent: Apr. 28, 2015

(54) WAVE ENERGY CONVERSION PLANT

(76) Inventor: Sui Kwang Chua, Klang Selangor Darul Ehsan (MY)

( * ) Notice: Subject to any disclaimer, the term of this patent is extended or adjusted under 35 U.S.C. 154(b) by 508 days.

(21) Appl. No.: 12/994,871

(22) PCT Filed: Jun. 1, 2009

(86) PCT No.: PCT/MY2009/000066
§ 371 (c)(1),
(2), (4) Date: Nov. 29, 2010

(87) PCT Pub. No.: WO2009/148296
PCT Pub. Date: Dec. 10, 2009

(65) Prior Publication Data
US 2011/0074160 A1    Mar. 31, 2011

(30) Foreign Application Priority Data
Jun. 2, 2008   (MY) ............... PI 20081889

(51) Int. Cl.
| | | |
|---|---|---|
| F03B 13/10 | (2006.01) | |
| F03B 13/12 | (2006.01) | |
| F03B 13/18 | (2006.01) | |
| F03B 17/02 | (2006.01) | |

(52) U.S. Cl.
CPC .......... *F03B 13/1815* (2013.01); *F03B 13/187* (2013.01); *F03B 17/025* (2013.01); *Y02E 10/20* (2013.01); *Y02E 10/38* (2013.01)

(58) Field of Classification Search
USPC .................................................. 290/42, 53
See application file for complete search history.

(56) References Cited

U.S. PATENT DOCUMENTS

| | | | |
|---|---|---|---|
| 1,930,958 A | | 10/1933 | Parsons |
| 4,184,336 A | * | 1/1980 | Lamberti ................. 60/507 |
| 4,622,471 A | * | 11/1986 | Schroeder ................. 290/42 |
| 4,622,473 A | | 11/1986 | Curry |
| 4,931,662 A | * | 6/1990 | Burton ...................... 290/42 |
| 6,327,994 B1 | * | 12/2001 | Labrador ................. 114/382 |
| 2003/0019207 A1 | * | 1/2003 | Parker ....................... 60/398 |
| 2006/0062676 A1 | * | 3/2006 | Jakubowski et al. ..... 416/244 R |
| 2007/0228737 A1 | | 10/2007 | Hirsch |

FOREIGN PATENT DOCUMENTS

| | | |
|---|---|---|
| CN | 101074643 A | 11/2007 |
| GB | 2417985 A | 3/2006 |
| GB | 2436595 A | 10/2007 |

(Continued)

OTHER PUBLICATIONS

International Search Report dated Feb. 10, 2010.
Written Opinion of the International Searching Authority dated Feb. 10, 2010.

(Continued)

*Primary Examiner* — Pedro J Cuevas
(74) *Attorney, Agent, or Firm* — Norris McLaughlin & Marcus, P.A.

(57) ABSTRACT

The present invention provides a structure driven by floats placed in a body of water such as a sea, an ocean or the like for converting wave energy into electricity. The structure comprises a floating body to float and stabilize the structure in the water wherein a platform is provided to house and hold energy conversion systems and mechanisms. The mechanisms include a plurality of pontoons that moves with the waves.

24 Claims, 8 Drawing Sheets

(56) References Cited

FOREIGN PATENT DOCUMENTS

| | | | |
|---|---|---|---|
| JP | 50-108439 | A | 8/1975 |
| JP | 51-056445 | U | 5/1976 |
| JP | 2007-528463 | A | 10/2007 |
| JP | 2007-536469 | A | 12/2007 |
| SU | 1532722 | A1 | 12/1989 |
| WO | 9004718 | A1 | 5/1990 |
| WO | 2004094814 | A1 | 11/2004 |
| WO | 2004113719 | A1 | 12/2004 |

OTHER PUBLICATIONS

Great Britain Examination Report for related Great Britian Application No. GB 1021695.0 dated Nov. 9, 2011.
Great Britain Examination Report for related Great Britian Application No. GB 1021695.0 dated Apr. 23, 2012.
Chinese Office Action for related Chinese Application No. CN 200980120444.6 dated Oct. 10, 2012.
Portugal Examination Report for related Portuguese Application No. PT 2009148296 dated Dec. 6, 2011.

* cited by examiner

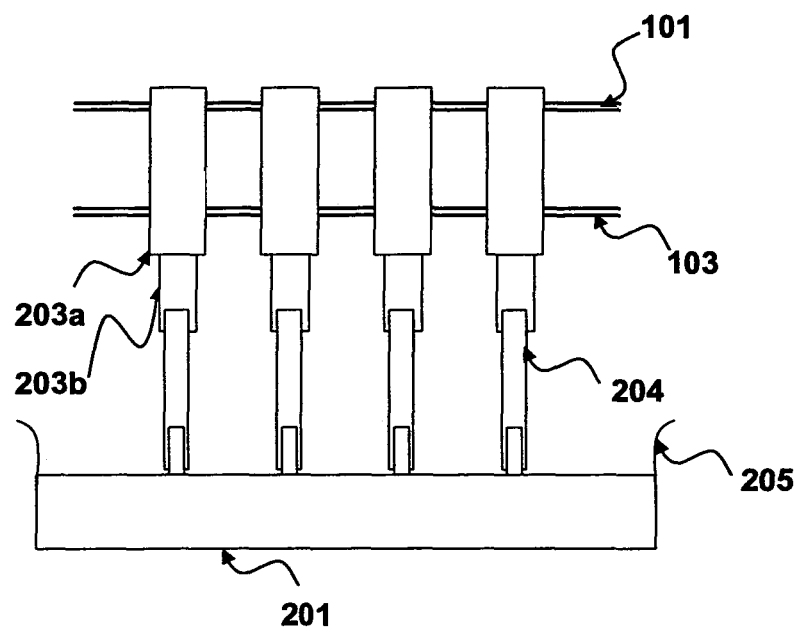
Fig. 4a (Section A-A)

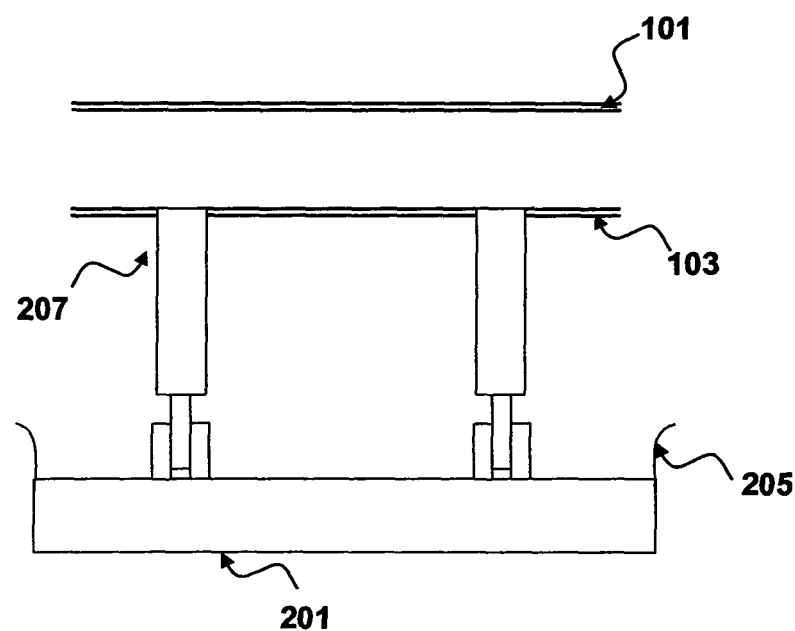
Fig. 4b (section B-B)

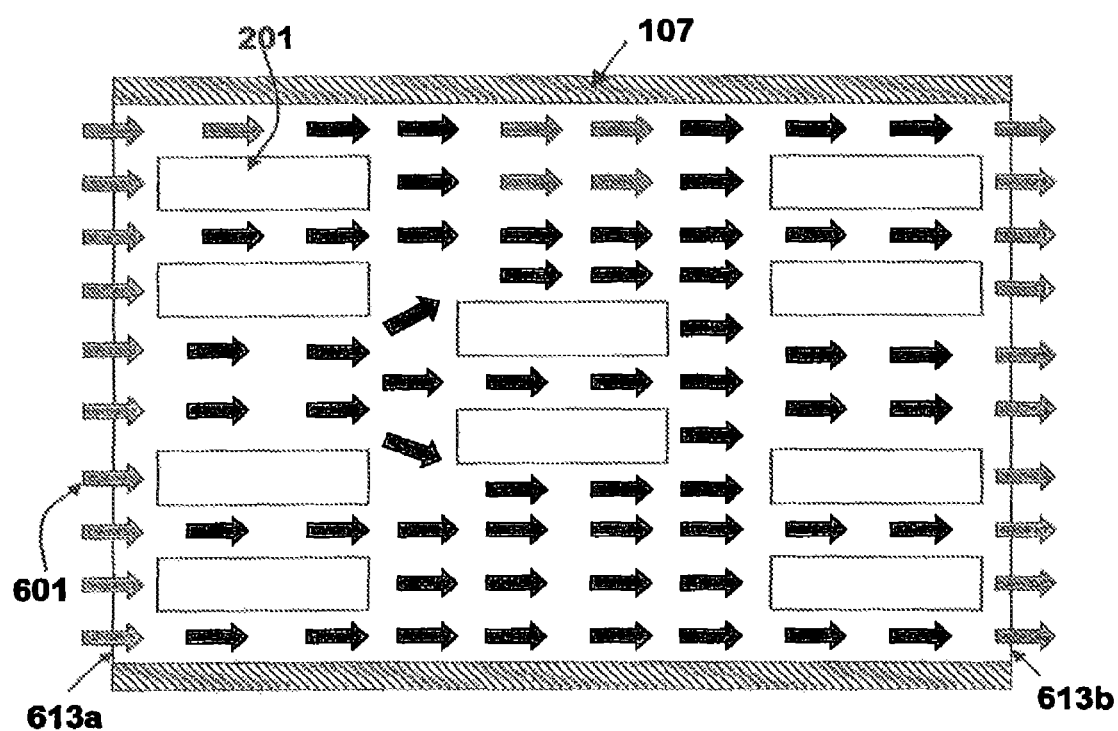
Fig. 6 (Section C-C)

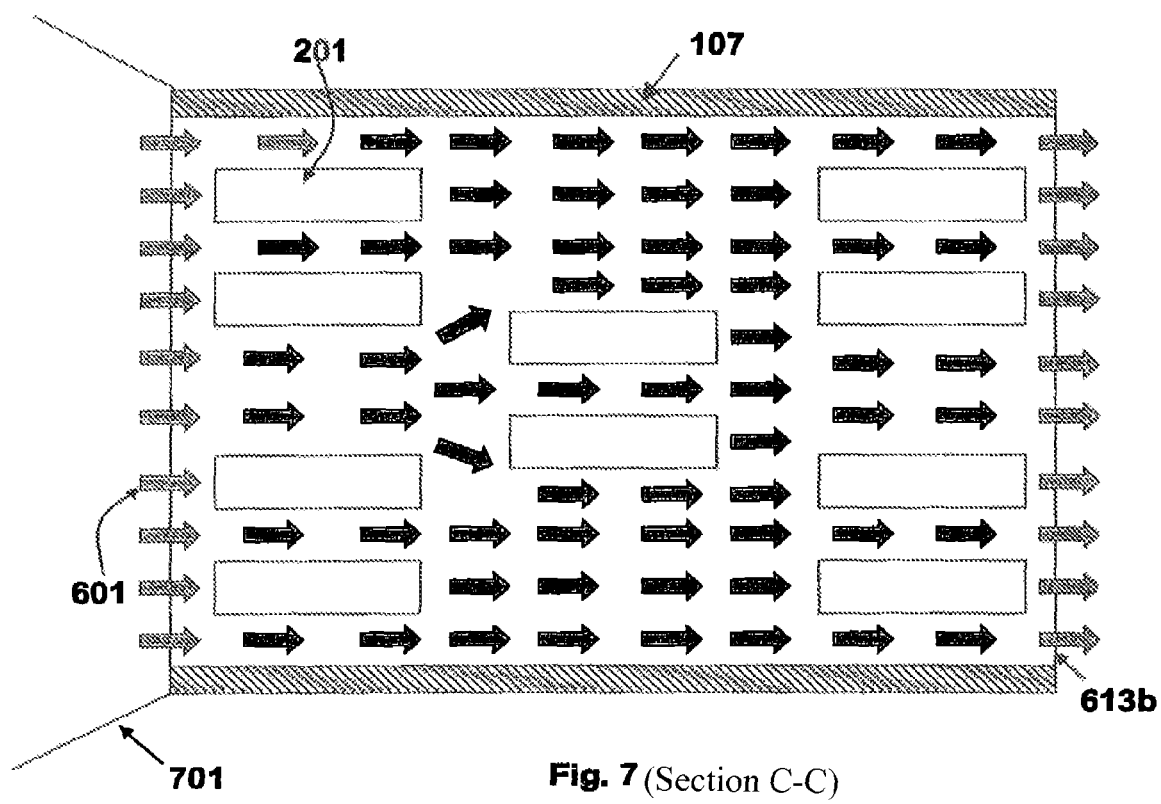
Fig. 7 (Section C-C)

WAVE ENERGY CONVERSION PLANT

This application is a 371 application of PCT/MY2009/000066 filed Jun. 1, 2009, which claims foreign priority benefit under 35 U.S.C. §119 of Malaysian application pi20081889 filed Jun. 2, 2008.

FIELD OF THE INVENTION

The present invention relates to a wave energy conversion plant and more particularly to a structure placed in a body of water such as a sea, an ocean or the like which converts wave energy and motion into electricity.

BACKGROUND OF THE INVENTION

Wave energy is known as one of the greatest sources of renewable energy that could be exploited to generate electricity. The progressive motion of the wave could be translated for continuous electricity supply. There are different solutions in generating electricity from waves which vary on different configurations.

Generally, wave energy conversion plant that is placed in the sea or ocean may be subject to ferocious wave conditions and powerful forces such as storm and rain. For a wave energy conversion plant to be both commercially and physically viable; it must be able to withstand these forces while at the same time protecting its energy conversion mechanisms from being affected.

It is an object in the present invention to provide a structure that could meet the above requirements by utilising both wave length and wave width in the most efficient way.

SUMMARY OF THE INVENTION

According to the present invention, a structure placed in a body of water such as a sea, an ocean or the like for converting wave energy and/or motion into electricity comprises a floating body resting in the water to float and support the structure. The floating body comprises double layered hulls having a bottom hull and side hulls for water ballast. The hulls are integrated to form an open ended maw having open ends to allow waves to pass through the maw from one end to the other end of the structure. A plurality of pontoons is provided within the maw to allow the pontoons to be pushed by the passing waves within the maw. By having the pontoons inside the maw, the pontoons are protected from being affected by the impact of side thrusts from rogue waves.

The bottom hull has a very broad flat surface to act as a giant damper to stabilise the structure which prevents the structure from being carried away or moved and undulate up and down with wave motion.

A platform is provided on top of the structure to house and hold a plurality of energy conversion systems. Wave energy conversion mechanisms cooperate with the energy conversion system to convert wave energy or motion into electricity. The wave energy conversion mechanism can be referred to, but not limited to as a mechanism which converts and transfers a translational motion of the wave into a reciprocal motion. The energy conversion systems can be referred to, but not limited to a system that converts the reciprocal motion and generates electricity.

The pontoons are individually pivoted about a fixed point located between aft and fore sections of the pontoon to allow a continuous rocking movement when being pushed by waves. The crest of oncoming waves will lift up the bow of the pontoon while simultaneously the stern of the pontoon will sink down into the trough of preceding waves. This is the reason for the pontoon length to be half the wave crest to crest distance. As the crest travels on towards the stern to lift it up, the bow will sink into the oncoming trough. The next oncoming crest will lift up the bow again. This cycle will take about fifteen seconds or so.

According to the present invention, when the pontoons rock about the pivot, a translational motion of the pontoons are transferred into a reciprocal or rotary motion by a crank mechanism that would push a piston of a hydraulic ram pump up and down. At least two crank mechanisms are provided between the fixed pivot so that reciprocal motion alternate between the crank mechanisms.

Hydraulic system is a system of choice to convert sea wave energy into electricity because the system provides a clean, neat and efficient energy conversion system. The surges developed in the system are evened out by using a pressure accumulator which results in a controlled speed and torque at a generating set.

The potential energy in a sea or an ocean wave is calculated by the following formula:

$$\text{Power/meter width wave front} = K \times h^2 \times t$$

Where K is a constant of 0.5; h is the wave height on meters (measured from crest to trough); and t is the period from crest to crest in seconds.

In order to produce as much electricity as possible, a plurality of pontoons is provided within the maw. The pontoons are configured to have wide and flat surfaces at the bottom to capture or absorb as much power of waves that push the pontoons.

Accordingly, the frontal aspect of each pontoon must be presented at right angles to the onslaught of energy-laden waves. The length of the pontoon must not be more than half the distance between wave crests. The fore and aft sections of each pontoon are preferably of equal length and weight so that the pontoons would easily return to its equilibrium position.

BRIEF DESCRIPTION OF THE DRAWINGS

The present invention will now be described by way of example only, with reference to the accompanying drawings, in which:

FIG. 4a is the A-A cross-section view of FIG. 3 showing the arrangement wave energy conversion mechanisms.

FIG. 4b is the B-B cross-section view of FIG. 3 showing the arrangement of holding members which hold a pontoon.

FIG. 6 is the C-C cross-section view of FIG. 1 showing the arrangement of the pontoons and flow profile of water passing through the maw viewed from the bottom.

FIG. 7 is the C-C cross-section view of FIG. 1 showing the structure is equipped with funnel extensions.

DETAILED DESCRIPTION OF THE INVENTION

The present invention relates to a wave energy conversion plant and more particularly to a structure placed in a body of water such as a sea or an ocean or the like. The structure has a plurality of wave energy conversion systems and mechanisms mounted on it to convert wave energy and motion into electricity.

Various modifications to the preferred embodiment and the principles and features described herein will be readily apparent to those skilled in the art. Thus, the present invention is not intended to be limited to the embodiments shown but to be accorded the widest scope consistent with the principles and features describe herein.

Figure 1:
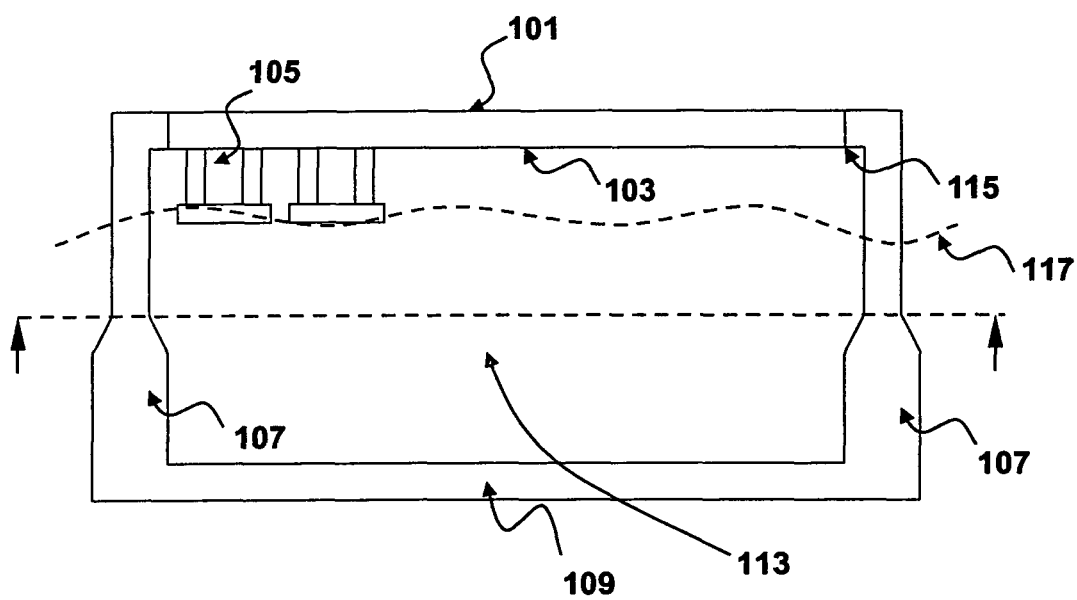
FIG. 1 is a front view of a structure placed in a body of water such as sea for converting waves into electricity with some of wave energy conversion mechanisms shown mounted to it.

Referring first to FIG. 1, there is shown a front view of a structure placed in a body of water for converting waves into electricity with a number of wave energy conversion mechanisms (105) mounted to a platform (101). The structure comprises floating body resting in the water to float and support the structure in the water. The floating body comprises double layered hulls having a bottom hull (109) and side hulls (107) for water ballast.

The bottom hull and the side hulls form an open ended maw (113). An opening is provided at each end of the maw to allow waves to pass through. The maw (113) has a U-shaped cross section wherein the vertical side hulls (107) extending downwardly from the platform at the top of the structure (115) integrally join the horizontal bottom hull (109) at the bottom of the structure.

A plurality of pontoons is provided inside the maw to be pushed by waves passing through the maw. Fixed holding members are provided to hold the pontoons in place so that the pontoons hang within the maw. The waves and water enter the open end at one side and leave the maw at the other open end at the other side.

The bottom hull (109) has a very broad flat surface to act as a giant damper essentially to stabilise the structure such that it prevents the structure from being carried away or moved and undulate up and down with to the motion of waves. With the water ballast facilities, the pontoons are maintained to be always at water surface (117). According to the present invention, the structure must not be anchored solidly to the sea or the ocean bed but must float and rise and fall with tides.

The platform comprises a multiple decks having an upper deck (101) and a lower deck (103) is provided to house and hold a plurality of energy conversion systems. Each system is directly connected with the wave energy mechanism to generate electricity.

Figure 2:
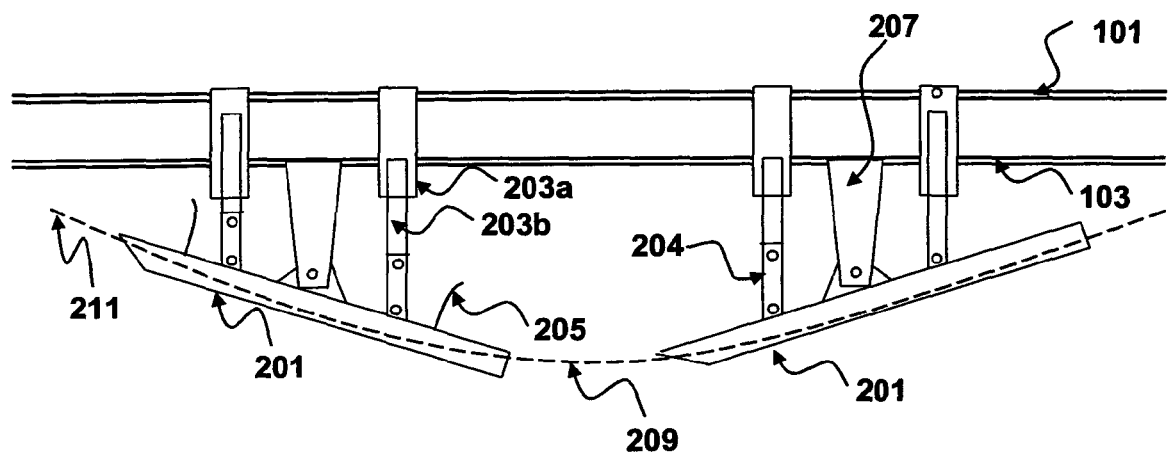
FIG. 2 is a side view of the wave energy conversion mechanisms with pontoons being pushed by passing waves.

As shown in FIG. 2, a plurality of pontoons is attached to wave energy conversion mechanisms (105). The pontoons (201) are individually pivoted at a fixed point located between aft and fore sections of the pontoon to allow a continuous rocking movement when being pushed by a series of oncoming wave crests. Firstly, the bow is pushed up (211) while at the same time the stern goes down (209), then as the wave crest moves towards the stern, the stern will be lifted up while the bow is going down. This fore and aft rocking is repeated endlessly, averaging one cycle every fifteen seconds or so. At least one holding member (207) is provided to hold the pontoon in place such that the pontoon is always at the water surface.

When the pontoon (201) rocks about the pivot, the translational motion of the pontoons is transferred into a reciprocating or rotary motion by a crank mechanism (204) that would push a piston (203b) of a hydraulic ram pump (203a) up and down. At least two crank mechanisms (204) are provided fore and aft between the fixed pivots so that the reciprocating motion alternates between the crank mechanisms (204). In this way, the rocking motion of the pontoon (201) is effectively utilized.

A hydraulic system is a system of choice in generating the electricity because the system provides a clean, neat and efficient energy conversion system such that the hydraulic surges are evened out by use of a pressure accumulator which result in a controlled speed and torque for electricity to be generated.

The length of the pontoon must not be more than half the distance between wave crests. The fore and aft sections of each pontoon are preferably of equal length and weight so that the pontoons would easily return to its equilibrium position.

As shown in FIG. 2, the length of the pontoon is half of the distance between two successive crests (211). When waves rush through the maw from bow to stern, and the pontoon bow is pushed up by crest, the stern will sink into the trough of the preceding wave. Thus there will be a continuous, alternating fore/aft rocking movement of each pontoon about the fixed pivot, which, by computing the mechanical advantage of the lever action of half the pontoon length being pushed up while attached to a fixed pivot, a tremendous amount of hydraulic power will be transferred to the hydraulic pump rams resisting this pushing motion. Most of the wave power is used to overcome the resistance of the hydraulic pump ram.

The pontoon has a wide and flat bottom surface in order to capture as much of the wave energy as possible. Further, the frontal aspect of each pontoon must be presented at right angles to the onslaught of energy-laden waves. The bow of the pontoon is configured to have a slanted surface (301). Further, a barrier (205) is provided to protect the holding member and the mechanisms from rogue waves.

Figure 3:
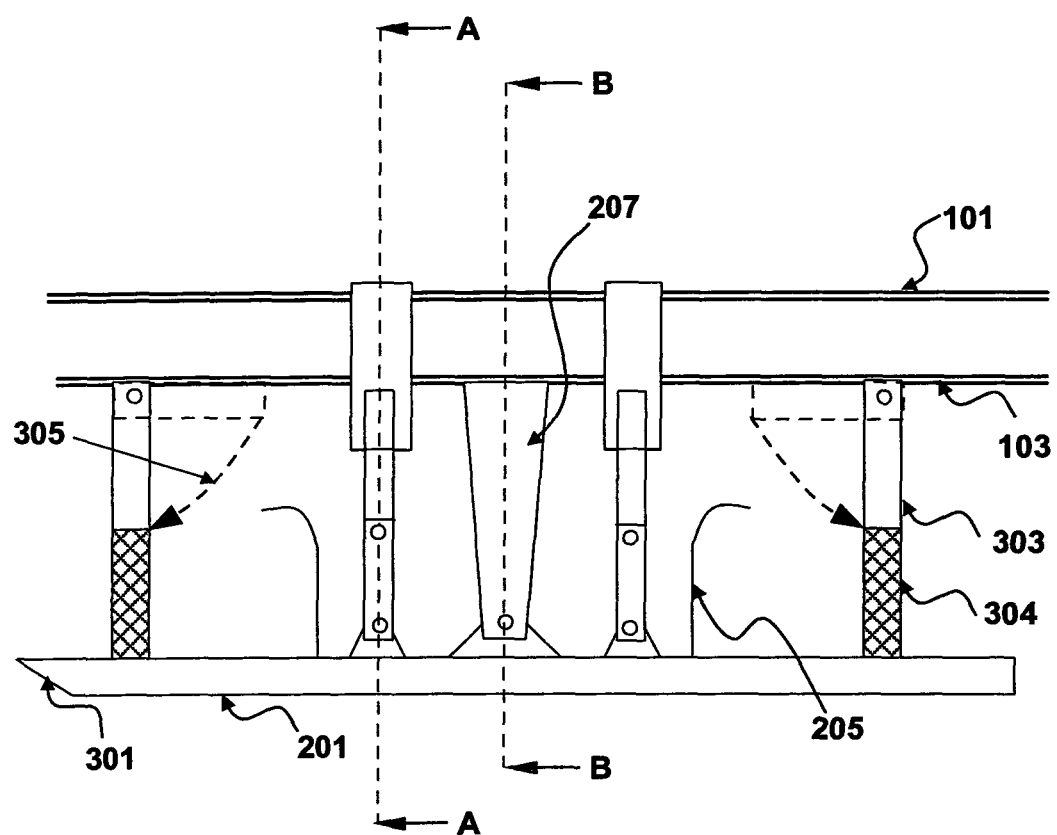
FIG. 3 is a side view of the wave energy conversion mechanism being immobilised with locking mechanism.

For servicing purposes, the pontoons are configured to be immobilized. The pontoons are locked by providing fixed pillars (304) to receive a locking arm (303) as shown in FIG. 3. During servicing, the locking arms are deployed from the platform to interlock the pontoon as illustrated by dashed line 305 in FIG. 3. The locking arm is further provided with a pillar that is extendable from the locking arm to interlock pontoon which is distanced apart by a longer holding member. The lower deck is distanced apart from the upper deck to allow person to walk on it and access the wave energy conversion mechanisms and the energy conversion systems.

FIG. 4a is the front view of the pontoon showing the arrangement of wave energy conversion mechanisms on the pontoon. In order to have a series of reciprocating motion which in turn generating electricity, a plurality of wave energy conversion mechanisms is provided over the pontoon. A shown in FIG. 4b, a pair of holding members is provided to hold a pontoon.

Figure 5:
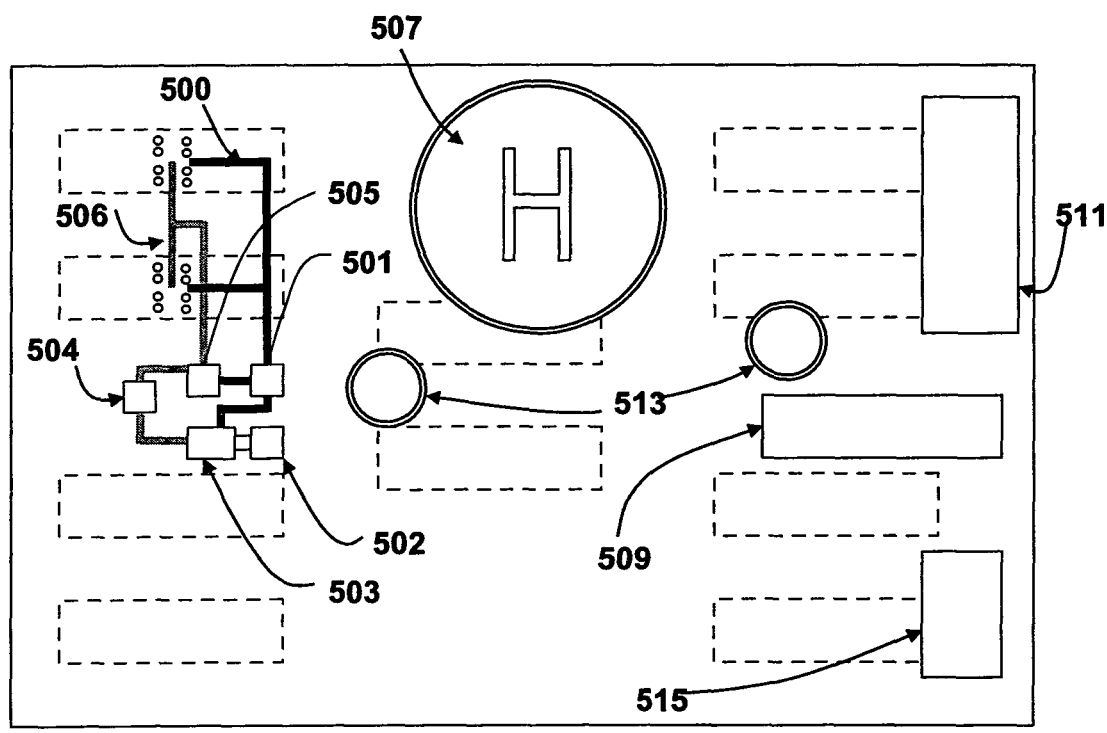
FIG. 5 is the plan view of the structure showing an energy conversion system connected to the wave energy conversion mechanism, and facilities provided on the structure.

As shown in FIG. 5 the upper deck (101) is an open ended area. The area is provided with a helipad (507), store (511), areas for crane to be positioned (513), electrical substation (515), and crew station (509). The energy conversion system comprising a pressure accumulator (501), high pressure hydraulic line (500), electrical generator (502), hydraulic motor (503), low pressure hydraulic line (506) oil cooler (504) and, oil tank (505). The system are mounted within the space provided between the upper and lower decks. Umbilical cords are provided to transfer the generated electricity from the electrical substation (515) to a land station.

A plurality of pontoons is provided within the maw (113) to utilise the passing waves in the maw. More pontoons mean more reciprocating motion could be produced and transferred and thus more electricity could be generated. The pontoons are arranged to effectively utilise the waves and water flow profile (601) entering the first open end (613a) and leaving second open end (613b). As shown in FIG. 6 the pontoons are arranged in pair wherein the pairs are positioned in series parallel to each other. The subsequent series preferably has more or less pairs than the first series. As shown in FIG. 6, the first series has more pairs of pontoons than the second series while the second series has less pairs than the third series.

Funnel extensions (701) are provided at the front open end (613*a*) to gather more frontal waves that allow more powerful waves entering the maw (113) as shown in FIG. 7

The invention claimed is:

1. A structure placed on a body of water for converting wave energy into electricity comprising:
   a floating body supporting the structure comprising a bottom hull and side hulls forming a maw which has a first opening at a first opened end and a second opening at a second opened end to allow water to flow into and through the maw, wherein the first opened end is located opposite to the second opened end;
   a plurality of wave energy conversion mechanisms comprising pontoons and crank mechanisms within the maw, movable with waves within the maw, to transfer wave motion into a continuous reciprocal motion;
   a plurality of energy conversion systems cooperating with the reciprocal motion of the wave energy mechanisms to generate electricity; and
   a platform connect to the side hulls to house the wave energy conversion mechanisms and energy conversion systems, wherein the side hulls extend continuously (i) from the first opened end to the second opened end of the maw, and (ii) from the platform to the bottom hull,
   wherein each pontoon is held within the maw by a holding member which extends from the platform and is pivoted about a fixed point located between aft and fore sections of the pontoon to allow the pontoon to rock up and down about a pivot when pushed by waves within the maw,
   wherein each pontoon has a partial length defined between a pair of crank mechanisms, a total height defined between a top side of each pontoon and a bottom side of each pontoon, and a total width defined between a first side of each pontoon and a second side of each pontoon, wherein the total height of each pontoon is constant and continuous along the entire partial length of each pontoon and across the entire total width of each pontoon, and
   further wherein a total length of each pontoon is greater than the total width of each pontoon and the height of each pontoon.

2. The structure according to claim 1, wherein the side hulls integrally join the bottom hull to form the maw with a U-shaped cross section.

3. The structure according to claim 2, wherein the bottom hull has a broad flat surface to dampen the structure against wave motion.

4. The structure according to claim 1, wherein the platform comprising a multiple decks having an upper deck and a lower deck.

5. The structure according to claim 1, wherein a water ballast in the hulls levels the structure so that the pontoons are always in contact with water surface.

6. The structure according to claim 1, wherein the energy conversion systems comprise high pressure and low pressure hydraulic lines, an electrical generator, a hydraulic motor, a pressure accumulator, an oil tank and an oil cooler, for each energy conversion system associated with each pair of pontoons.

7. The structure according to claim 4, wherein the energy conversion systems are mounted within the space provided between the upper and lower decks.

8. The structure according to claim 1, wherein the platform, connected to the side hulls, comprises (i) an upper deck configured to provide at least one selected from the group consisting of an area for a helipad, cranes, a store room, a crew station and an electrical substation for transferring electricity to land and (ii) a lower deck separated from the upper deck by a distance configured to allow crew to walk on the lower deck and access at least one wave energy conversion mechanism.

9. The structure according to claim 8, wherein generated electricity is transferred from the electrical substation to a land station by umbilical cords.

10. The structure according to claim 1, wherein each pontoon, held by the holding member extending from the platform, pivots at a midpoint of the pontoon to allow the pontoon to move freely with waves within the maw and cooperate with at least one of the crank mechanisms.

11. The structure according to claim 10, wherein the at least one of the crank mechanisms pushes a piston of a hydraulic pump ram up and down.

12. The structure according to claim 1, wherein the reciprocal motion alternates between the aft and fore of the pontoons.

13. The structure according to claim 1, wherein each pontoon has a flat bottom surface and slanted straight surface at bow of the pontoon.

14. The structure according to claim 1, wherein each pontoon has a water barrier shielding the holding member and the wave energy conversion mechanisms from being affected by an impact of at least one rogue wave.

15. The structure according to claim 1, wherein the structure is provided with funnel extensions to allow a wave to travel from a wide section to a narrow section before entering the maw.

16. The structure according to claim 1, wherein the platform is provided with a locking arm on top of the aft and fore sections of each pontoon to immobilized the pontoon during servicing.

17. The structure according to claim 16, wherein the locking arm is further provided with a pillar extendable from the locking arm to interlock each pontoon.

18. A method for converting wave energy into electricity comprising:
   floating a structure in a body of water, wherein the structure comprises a platform,
   forming a maw in the structure with an first opened end and a second opened end, located opposite to the first opened end, to allow water and waves to pass through the maw, wherein the maw comprises a bottom hull and side hulls that extend continuously (i) from the first opened end to the second opened end of the maw, and (ii) from the platform to the bottom hull;
   converting and transferring waves motion into reciprocal motion by hanging pontoons within the maw from fixed holding members extending from the platform and allowing the pontoons to rock up and down about a pivot when being pushed by waves in the maw; and
   levelling the structure to allow the pontoons within the maw to be pushed by passing waves in the maw,
   wherein each pontoon has a partial length defined between a pair of crank mechanisms, a total height defined between a top side of each pontoon and a bottom side of each pontoon and a total width defined between a first side of each pontoon and a second side of each pontoon, wherein the total height of each pontoon is constant and continuous along the entire partial length of each pontoon and across the entire total width of each pontoon, and further wherein a total length of each pontoon is greater than the total width of each pontoon and the height of each pontoon.

19. The method according to claim 18, wherein the side hulls integrally join the bottom hull to create a U-shaped cross section.

20. The method according to claim 18, further comprising:
allowing the pontoons, within the maw, to move freely with waves, within the maw, and connecting the pontoons with crank mechanisms to convert and transfer wave motion into reciprocal motion.

21. The method according to claims 18, further comprising:
ballasting water into and from the bottom and/or side hulls to level the structure.

22. The method according to claim 20, wherein the reciprocal motion pushes a piston of a hydraulic pump ram up and down to generate electricity.

23. The structure according to claim 13, wherein fore and aft sections of each pontoon are of equal length.

24. A structure placed on a body of water for converting wave energy into electricity comprising:
a floating body supporting the structure comprising a bottom hull and side hulls forming a maw which has a first opening at a first opened end and a second opening at a second opened end to allow water to flow into and through the maw, wherein the first opened end is located opposite to the second opened end;

a plurality of wave energy conversion mechanisms comprising pontoons, within the maw, movable with waves, within the maw, to transfer wave motion into a continuous reciprocal motion;

a plurality of energy conversion systems cooperating with the reciprocal motion of wave energy mechanisms to generate electricity; and a platform connect to the side hulls to house the wave energy conversion mechanisms and energy conversion systems, wherein the side hulls extend continuously (i) from the first opened end to the second opened end of the maw, and (ii) from the platform to the bottom hull, wherein each pontoon is held within the maw by a holding member which extends from the platform and is pivoted about a fixed point located between aft and fore sections of the pontoon to allow the pontoon to rock up and down about a pivot when pushed by waves within the maw wherein each pontoon has a total length defined by a first end of each pontoon and a second end of each pontoon, a total height defined between a top surface of each pontoon and a bottom surface of each pontoon and a total width defined between a first side of each pontoon and a second side of each pontoon, wherein each pontoon is substantially planar, and further wherein the total length of each pontoon is greater than the total width of each pontoon and the total height of each pontoon.

* * * * *